US008897311B2

(12) United States Patent
Asati et al.

(10) Patent No.: US 8,897,311 B2
(45) Date of Patent: *Nov. 25, 2014

(54) DYNAMIC DISCOVERY MECHANISMS VIA INTER-DOMAIN ROUTING PROTOCOL

(75) Inventors: Rajiv Asati, Morrisville, NC (US); David Delano Ward, Los Gatos, CA (US); Russell I. White, Holly Springs, NC (US); Keyur P. Patel, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 483 days.

This patent is subject to a terminal disclaimer.

(21) Appl. No.: 13/365,597

(22) Filed: Feb. 3, 2012

(65) Prior Publication Data

US 2012/0134368 A1 May 31, 2012

Related U.S. Application Data

(63) Continuation of application No. 12/491,034, filed on Jun. 24, 2009, now Pat. No. 8,121,136.

(51) Int. Cl.
*H04L 12/28* (2006.01)
*H04L 12/56* (2006.01)
*H04L 1/00* (2006.01)
*H04L 12/26* (2006.01)
*G06F 15/173* (2006.01)

(52) U.S. Cl.
USPC ........... 370/401; 370/225; 370/236; 370/392; 370/395.53; 370/406; 709/224; 709/242

(58) Field of Classification Search
CPC ......... H04L 45/28; H04L 45/22; H04L 47/10; H04L 47/2441; H04L 45/00; H04L 29/0653; H04L 12/4641; H04L 29/06; H04L 12/4637; H04L 29/08072; H04L 45/02; H04Q 11/0478
USPC ............ 370/225, 401, 235, 395.53, 392, 406, 370/236; 709/238, 242, 224
See application file for complete search history.

(56) References Cited

U.S. PATENT DOCUMENTS

| 7,318,108 | B2 | 1/2008 | Sreekantiah et al. |
|---|---|---|---|
| 7,532,631 | B2 | 5/2009 | Raszuk et al. |
| 7,633,859 | B2 | 12/2009 | Filsfils et al. |
| 7,675,912 | B1 | 3/2010 | Ward et al. |
| 2004/0059831 | A1 | 3/2004 | Chu et al. |
| 2005/0076114 | A1 | 4/2005 | Cook |
| 2006/0164975 | A1 | 7/2006 | Filsfils et al. |

(Continued)

OTHER PUBLICATIONS

U.S. Appl. No. 12/491,034, Response filed Jul. 27, 2011 to Non Final Office Action mailed Apr. 29, 2011, 10 pgs.

(Continued)

*Primary Examiner* — Ronald Abelson (57) ABSTRACT

In an embodiment, a method is provided at which it is used in a device. In this method, a logical identifier assigned to the device is identified and additionally, a mesh group identifier identifying a mesh group is identified. The logical identifier and the mesh group identifier are encoded in a routing message, which is used in an inter-domain routing protocol, and this routing message is transmitted to a reflector device in communication with the device. The reflector device is configured to transmit the routing message to a remote device included in the computer network.

21 Claims, 8 Drawing Sheets

(56) References Cited

U.S. PATENT DOCUMENTS

| | | |
|---|---|---|
| 2006/0209851 A1 | 9/2006 | Scudder et al. |
| 2006/0233181 A1* | 10/2006 | Raszuk et al. ................ 370/401 |
| 2006/0268715 A1 | 11/2006 | Zuniga et al. |
| 2007/0097974 A1 | 5/2007 | Ward et al. |
| 2007/0097991 A1 | 5/2007 | Tatman |
| 2007/0115990 A1 | 5/2007 | Asati et al. |
| 2007/0162614 A1 | 7/2007 | Patel et al. |
| 2009/0135843 A1 | 5/2009 | Veillette |
| 2009/0144443 A1* | 6/2009 | Vasseur et al. ................ 709/238 |
| 2009/0232003 A1 | 9/2009 | Vasseur et al. |
| 2010/0074268 A1 | 3/2010 | Raza |
| 2010/0329270 A1 | 12/2010 | Asati et al. |

OTHER PUBLICATIONS

U.S. Appl. No. 12/491,034, Non Final Office Action mailed Apr. 29, 2011, 38 pgs.

U.S. Appl. No. 12/491,034, Notice of Allowance mailed Oct. 19, 2011, 5 pgs.

* cited by examiner

DYNAMIC DISCOVERY MECHANISMS VIA INTER-DOMAIN ROUTING PROTOCOL

CROSS-REFERENCES TO RELATED APPLICATIONS

This is a continuation application of application Ser. No. 12/491,034, filed Jun. 24, 2009, the disclosure of which is incorporated herein by reference.

FIELD

The present disclosure relates generally to computer networks. In an example embodiment, the disclosure relates to dynamic discovery mechanisms via inter-domain routing protocol.

BACKGROUND

Many networks require that all routers within a Border Gateway Protocol (BGP) domain to be fully meshed. For large networks, this full mesh requirement represents a severe scaling problem as it is rather difficult to manually configure a large number of routers. Furthermore, a full mesh also presents a continuing problem as it requires the configuration of every router to be changed when a new router is added to the network.

BRIEF DESCRIPTION OF DRAWINGS

The present disclosure is illustrated by way of example and not limitation in the figures of the accompanying drawings, in which like references indicate similar elements and in which.

DESCRIPTION OF EXAMPLE EMBODIMENTS

In the following description, for purposes of explanation, numerous specific details are set forth in order to provide a thorough understanding of embodiments of the present disclosure. It will be evident, however, to one skilled in the art that the present disclosure may be practiced without these specific details.

Overview

A method is provided, which is used in a device. In this method, a logical identifier assigned to the device is identified and additionally, a mesh group identifier identifying a mesh group is identified. The logical identifier and the mesh group identifier are encoded in a routing message, which is used in an inter-domain routing protocol, and this routing message is transmitted to a reflector device in communication with the device. The reflector device is configured to transmit the routing message to a remote device included in the computer network.

Example Embodiments

Figure 1A:
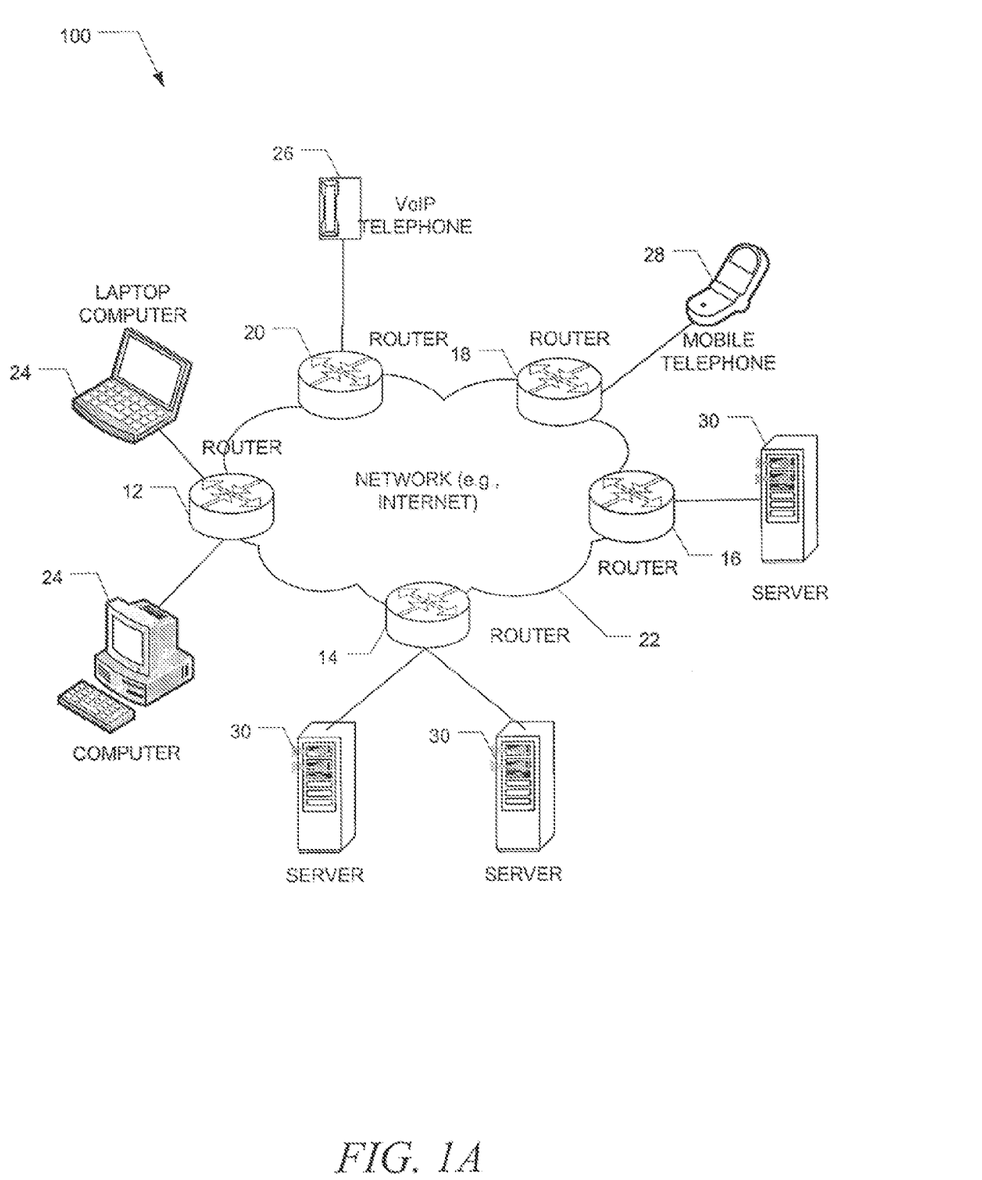
FIG. 1A depicts a diagram of a network system, in accordance with an illustrative embodiment.

FIG. 1A depicts a diagram of a network system 100, in accordance with an illustrative embodiment. The network system 100 includes various network nodes, which may be embodied in devices or apparatuses 12, 14, 16, 18, 20, 24, 26, 28, and 30, and data is communicated between the various network nodes. In particular, the network nodes may include routers 12, 14, 16, 18 and 20 that are shown to be connected by way of a computer network 22, which may include one or more Local Area Networks (LANs) and/or Wide Area Networks (WANs), such as the Internet. The network system 100 also includes other devices such as, for example, computers 24, Voice-over-Internet Protocol (VoIP) telephone 26, mobile telephone 28, and servers 30.

In the network system 100, data is communicated by way of Internet Protocol (IP) packets or datagrams using a variety of suitable upper-layer transport communication protocols. For example, packets may be encapsulated and communicated using Transmission Control Protocol (TCP)/Hypertext Transport Protocol (HTTP), User Datagram Protocol (UDP) protocol, and/or Stream Control Transmission Protocol (SCTP). Although the network system 100 is shown to include routers 12-20, it should be noted that the embodiments described herein are equally applicable to other devices that receive digital data for processing and communication to other devices, such as servers 30 and routing devices.

Figure 1B:
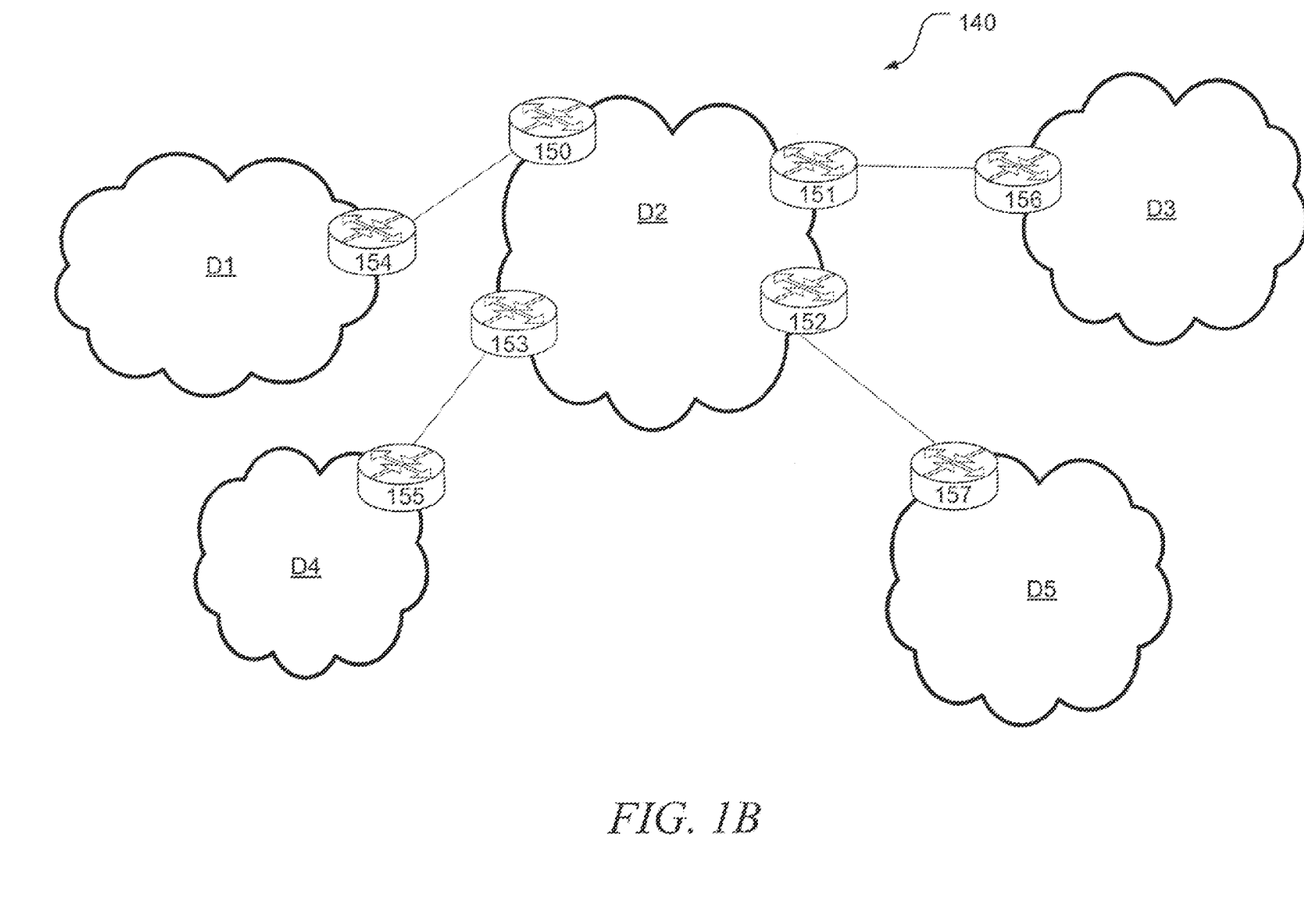
FIG. 1B depicts a diagram of an example of a computer network, in accordance with an embodiment.

FIG. 1B depicts a diagram of an example of a computer network 140, in accordance with an embodiment. As shown in FIG. 1B, the computer network 140 includes multiple domains D1-D5 interconnected by inter-domain routers 150-157. It should be appreciated that groups of computer networks may be maintained as routing domains D1-D5. A domain, such as domain D1, D2, D3, D4 or D5, is a collection of network nodes under the control of one or more entities that present a common routing policy. A "domain" D1, D2, D3, D4 or D5 may also be referred to as an autonomous system, a routing domain, or community.

The distinct networks within domains D1-D5 can be coupled together by inter-domain routers 150-157 subject to a common authority that are configured to communicate by way of routing protocols. In general, a routing protocol is a protocol that specifies how routers or other devices communicate with each other to disseminate routes and other logical identifiers, and thereby allows the routers or other devices to determine optimal routes for flows of network packets. An example of a routing protocol is Border Gateway Protocol (BGP), which is an inter-domain routing protocol used within the Internet to exchange IP address prefix and network layer reachability information between domains D1-D5 and to distribute external IP address prefix information within a domain D1, D2, D3, D4, or D5. Other examples of inter-domain protocols include Interior Border Gateway Protocol (a type of BGP), Exterior Border Gateway Protocol (a type of BGP), and other inter-domain protocols.

Figure 2:
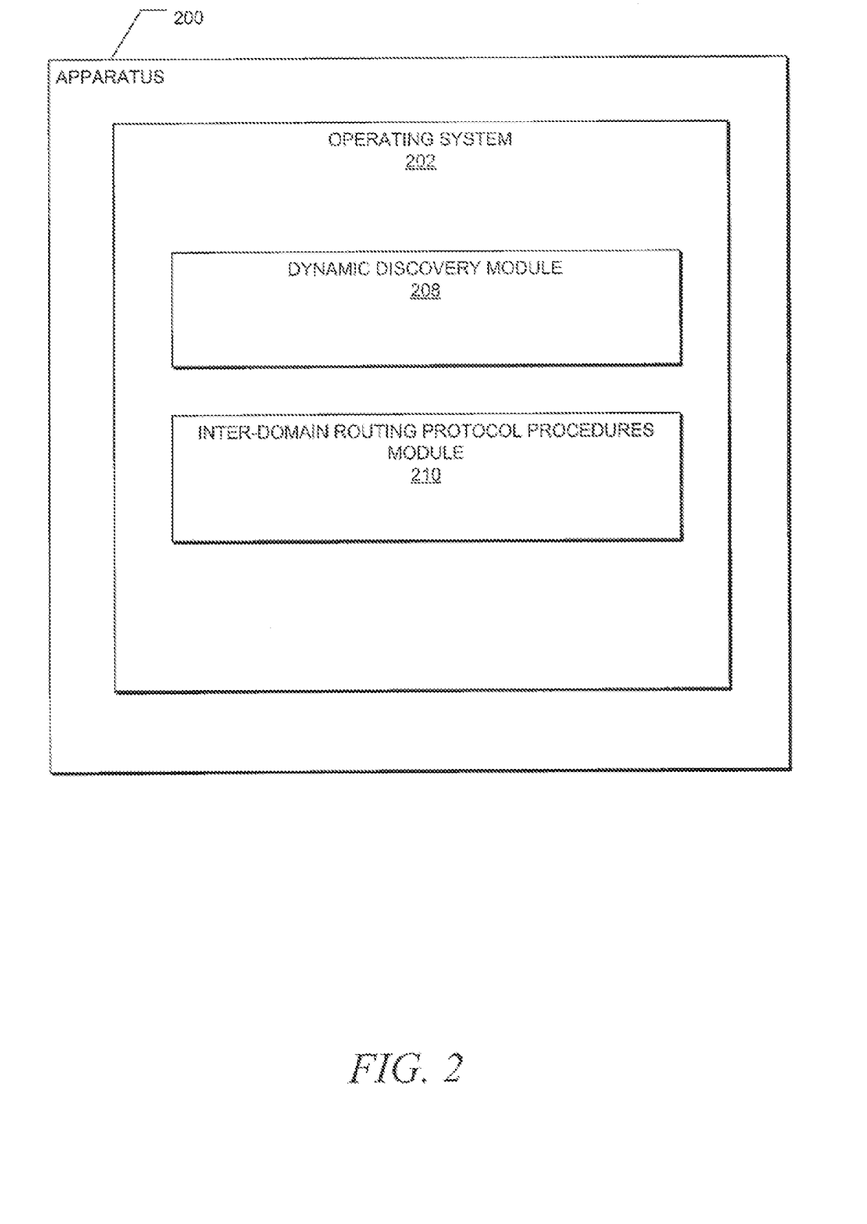
FIG. 2 depicts a block diagram of modules included in an apparatus, in accordance with an embodiment, configured to dynamically discover devices in a computer network.

FIG. 2 depicts a block diagram of modules 208 and 210 included in an apparatus 200, in accordance with an embodiment, configured to dynamically discover devices in a computer network. It should be appreciated that the apparatus 200 may be deployed in the form of a variety of devices, such as the routers 12-20, the computers 24, and the servers 30 depicted in FIG. 1. In various embodiments, the apparatus 200 may be used to implement computer programs, logic, applications, methods, processes, or other software to discover devices in a computer network, as described in more detail below.

As depicted in FIG. 2, the apparatus 200 may include an operating system 202 (e.g., an Internetworking Operating System) that manages the software processes and/or services executing on the apparatus 200. As depicted in FIG. 2, these software processes and/or services may include a dynamic discovery module 208 and an inter-domain routing protocol procedures module 210.

The inter-domain routing protocol procedures module 210 performs various standard procedures or functions provided by an inter-domain routing protocol. An example of such a procedure is session establishment. Another procedure receives and forwards routes. It should be appreciated that a single session involves at least two network nodes and involves an exchange of routing information by way of, for example, a point-to-point TCP connection. For example, one network node can notify the other network node, for example, that a particular route is available to a particular network or that a previously advertised route is no longer available. As explained in more detail below, such notifications may be in the form of routing messages. Network nodes receiving the route updates use the information to update their own forwarding tables and to propagate the route updates further. Generally, a network node receiving multiple routes to the same destination network picks one or more for its forwarding table and distributes to other network nodes via inter-domain routing protocol. In this manner, information about how to route packets across domain boundaries is propagated across the Internet.

The dynamic discovery module 208 is configured to dynamically discover other peer devices (e.g., routers, computers, servers, and other devices) by way of inter-domain routing protocol. As explained in more detail below, the dynamic discovery module 208 transmits one or more requests in the form of routing messages to establish sessions with other devices in the computer network. These requests are transmitted to a reflecting device, which relays or reflects these requests to the other devices. Upon receipt of the requests, these other devices can identify the apparatus 200 requesting the sessions from the requests and may directly establish sessions with the apparatus 200.

It should be appreciated that in other embodiments, the apparatus 200 may include fewer or more modules apart from those shown in FIG. 2. For example, the inter-domain routing protocol procedures module 210 may be separated into multiple modules, such as a route computation module that computes routes and another reroute module that reroutes network traffic. The modules 208 and 210 may be in the form of software that is processed by a processor. In another example, the modules 208 and 210 may be in the form of firmware that is processed by Application Specific Integrated Circuits (ASICs), which may be integrated into a circuit board. Alternatively, the modules 208 and 210 may be in the form of one or more logic blocks included in a programmable logic device (e.g., a field-programmable gate array). The described modules 208 and 210 may be adapted, and/or additional structures may be provided, to provide alternative or additional functionalities beyond those specifically discussed in reference to FIG. 2. Examples of such alternative or additional functionalities will be discussed in reference to the flow diagrams discussed below. The modifications or additions to the structures described in relation to FIG. 2 to implement these alternative or additional functionalities will be implementable by those skilled in the art, having the benefit of the present specification and teachings.

Figure 3:
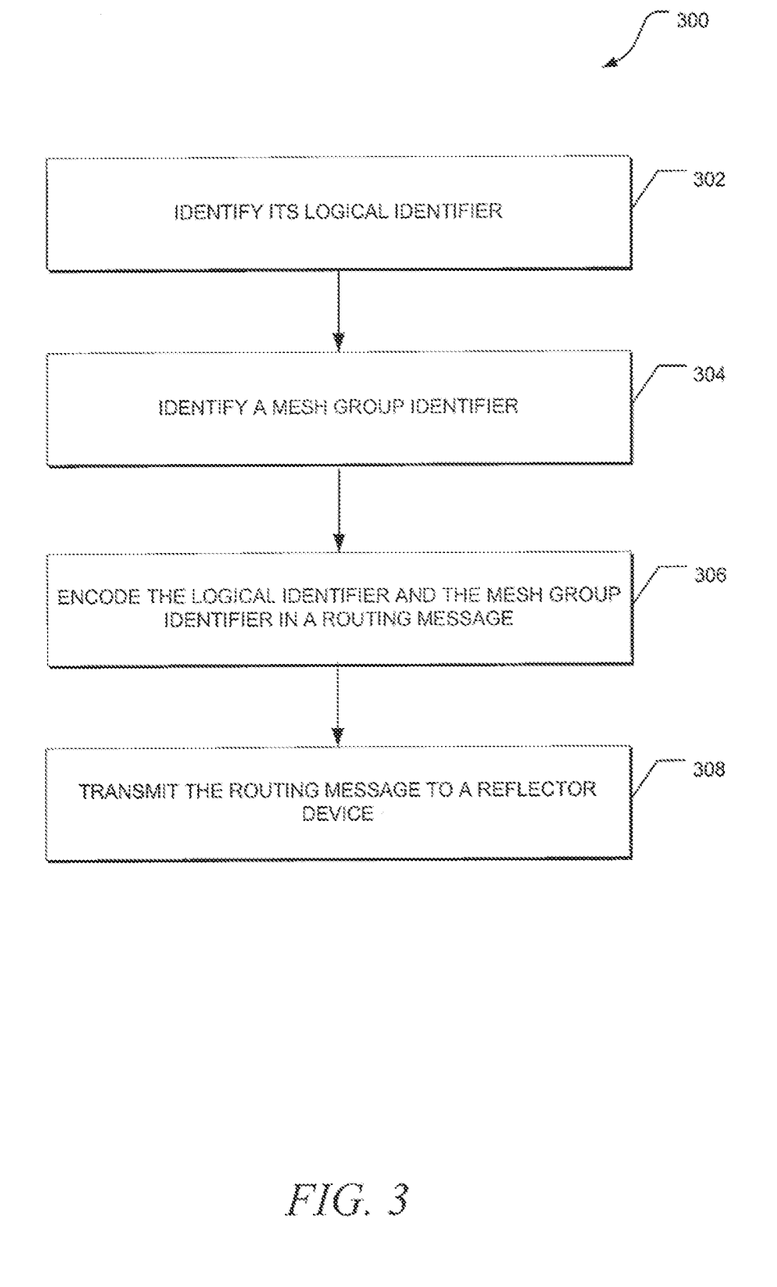
FIG. 3 depicts a flow diagram of a general overview of a method, in accordance with an example of an embodiment, for dynamically discovering devices in a computer network.

FIG. 3 depicts a flow diagram of a general overview of a method 300, in accordance with an example of an embodiment, for dynamically discovering devices in a computer network. In an embodiment, the method 300 may be implemented by the dynamic discovery module 208 and the inter-domain routing protocol procedures module 210 of FIG. 2 and employed in the apparatus 200. As depicted in FIG. 3, the apparatus or device initially identifies its logical identifier at 302. A "logical identifier," as used herein, refers to a value that uniquely identifies one or more devices participating in a computer network. An example of a logical identifier is a logical address, which refers to a network layer address such as an Internet Protocol (IP) address or an Internetwork Packet Exchange address.

Additionally, the mesh group identifier is identified at 304. A "mesh group identifier," as used herein, refers to a value that uniquely identifies a mesh group. As used herein, a "mesh group" refers to a group of devices that have fully meshed connectivity among themselves. The mesh group may include a partial mesh or even a full mesh. An example of a mesh group identifier is a four-byte identifier that identifies a group for which BGP speakers request to form BGP sessions.

The device then encodes the logical identifier and the mesh group identifier in a routing message at 306. A "routing message," as used herein, refers to a message that, for example, communicates routing information. Devices in a computer network may exchange routing information using routing messages after they have established a session. An example of a routing message is a BGP update message, which is used to provide routing updates between BGP systems. In an embodiment, the device uses the routing message to communicate a request to establish sessions within a particular mesh group with other devices in the computer network. As explained in more detail below, the other devices may use the logical identifier and the mesh group identifier encoded in the routing message to establish a session. In an alternate embodiment, if sessions are already established, then the device can use the routing message to communicate a request to withdraw from the sessions. As explained in more detail below, the requests to establish or to withdraw from sessions may be defined in particular attributes of the routing messages.

The routing message is then transmitted to a reflector device at 308. A "reflector device," as used herein, refers to a device that is configured to pass, transmit, or reflect at least the mesh group identifiers included in messages. An example of such a device is a route reflector that serves as a focal point for BGP sessions and is configured to transmit or reflect routes to internal neighboring network nodes or devices. A computer configured to reflect the request for dynamic neighbor discovery is another example of a reflector device. At this point, it should be noted that the devices in communication with the reflector device cannot directly transmit routing messages to each other because they have not yet detected each other. However, the reflector device is configured to be in communication with many or all the devices in the computer network and, as illustrated in more detail below, may be used to reflect the routing messages to these other devices.

Figure 4:
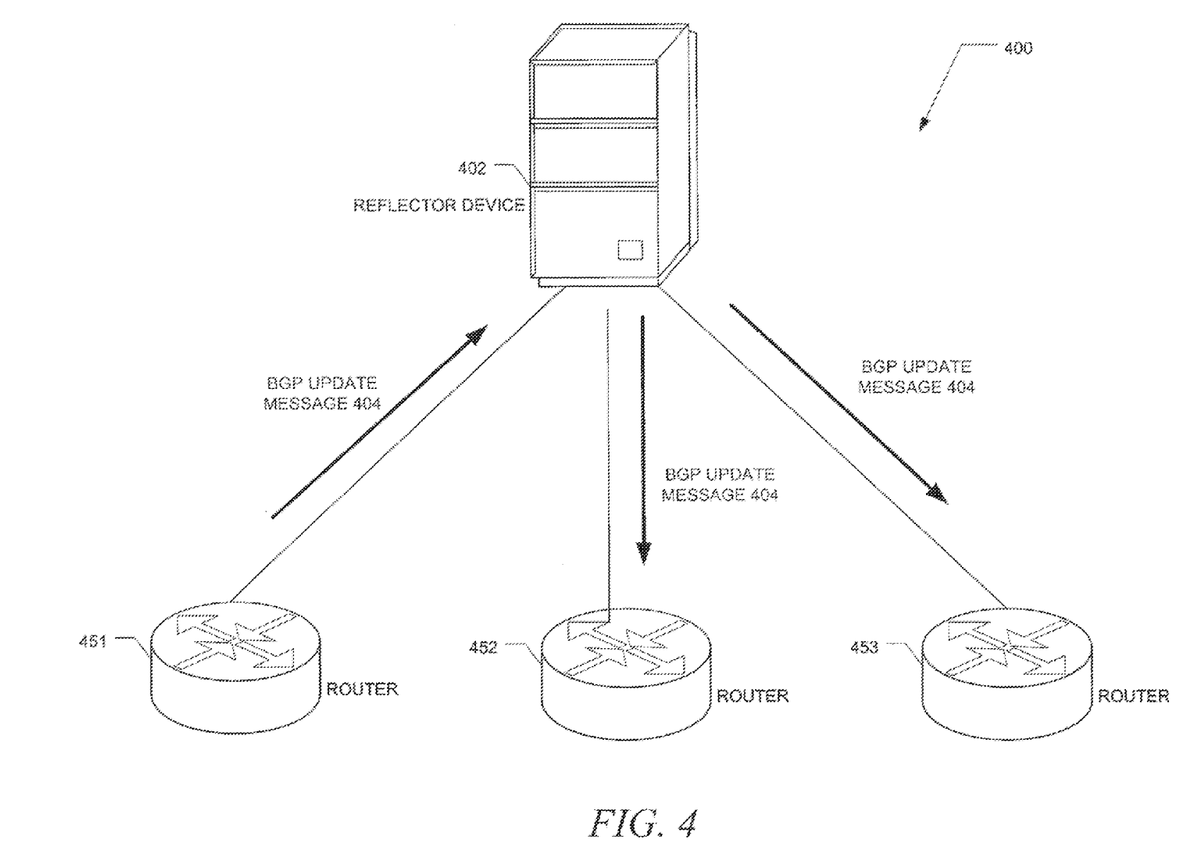
FIG. 4 depicts a diagram of a network system, in accordance with an illustrative embodiment, for advertising a request to discover other routers in a computer network and establish Border Gateway Protocol (BGP) sessions with these other routers.

FIG. 4 depicts a diagram of a network system 400, in accordance with an illustrative embodiment, for advertising a request to discover other routers in a computer network and establish BGP sessions with these other routers. In this example, the network system 400 includes a reflector device 402 in communication with routers 451-453. Each router 451, 452, or 453 is not in communication with each other because the routers 451-453 have not yet discovered each other. On the other hand, each router 451, 452, or 453 is in communication with the reflector device 402.

In this example, the router 451 is configured to discover and establish BGP sessions with other routers, such as routers 452-453, in the computer network. To discover the other routers 452-453, the router 451 initially transmits a BGP update message 404 to the reflector device 402. In general, this BGP update message 404 communicates an identification of the router 451 and a request to establish a BGP session within a particular mesh group. This BGP update message 404 includes the IP address of the router 451 and also a mesh group identifier. In an embodiment, the BGP update message 404 includes a network layer reachability information (NRLI) field, which can be used to encode the various identifiers used for dynamic discovery, such as the IP address and/or the mesh group identifier.

It should be appreciated that the BGP update message 404 comprises a Multiprotocol Reachable NRLI (MP_REACH_NRLI) attribute that includes the NRLI field as well as the Address-Family/Sub-Address-Family (API/SAFI) fields that dictate the format of the NRLI field. Unlike the conventional usage of the MP_REACH_NLRI attribute to early a set of reachable destinations together with next hop information used for forwarding to these destinations, embodiments of the invention defines a new API/SAFI and a new NLRI attribute format to convey the dynamic discovery information. Particularly, in an embodiment, to request the establishment a BGP session within a particular mesh group, the logical identifier in the form of an IP address and the mesh group identifier may be encoded in the MP_REACH_NLRI attribute. On the other hand, to request a withdrawal from a BGP session within a particular mesh group, the logical identifier in the form of an IP address and the mesh group identifier are encoded in the Multiprotocol Unreachable NRLI (MP_UNREACH_NLRI) attribute, which is used to carry a set of unreachable destinations. In one embodiment, the field included in the MP_REACH_NLRI and MP_UNREACH_NLRI attributes comprises one or more fields. For example, the address as the logical identifier is encoded in one field while the mesh group identifier is encoded in another field.

Still referring to FIG. 4, once the reflector device 402 receives the BGP update message 404 from the router 451, it reflects the BGP update message 404 to routers 452 and 453. As explained in more detail below, the routers 452 and 453 can discover the existence of the router 451 from this reflected BGP update message 404. With the router 451 discovered, either or both routers 452 and 453 may directly establish a BGP session with the router 451.

Figure 5:
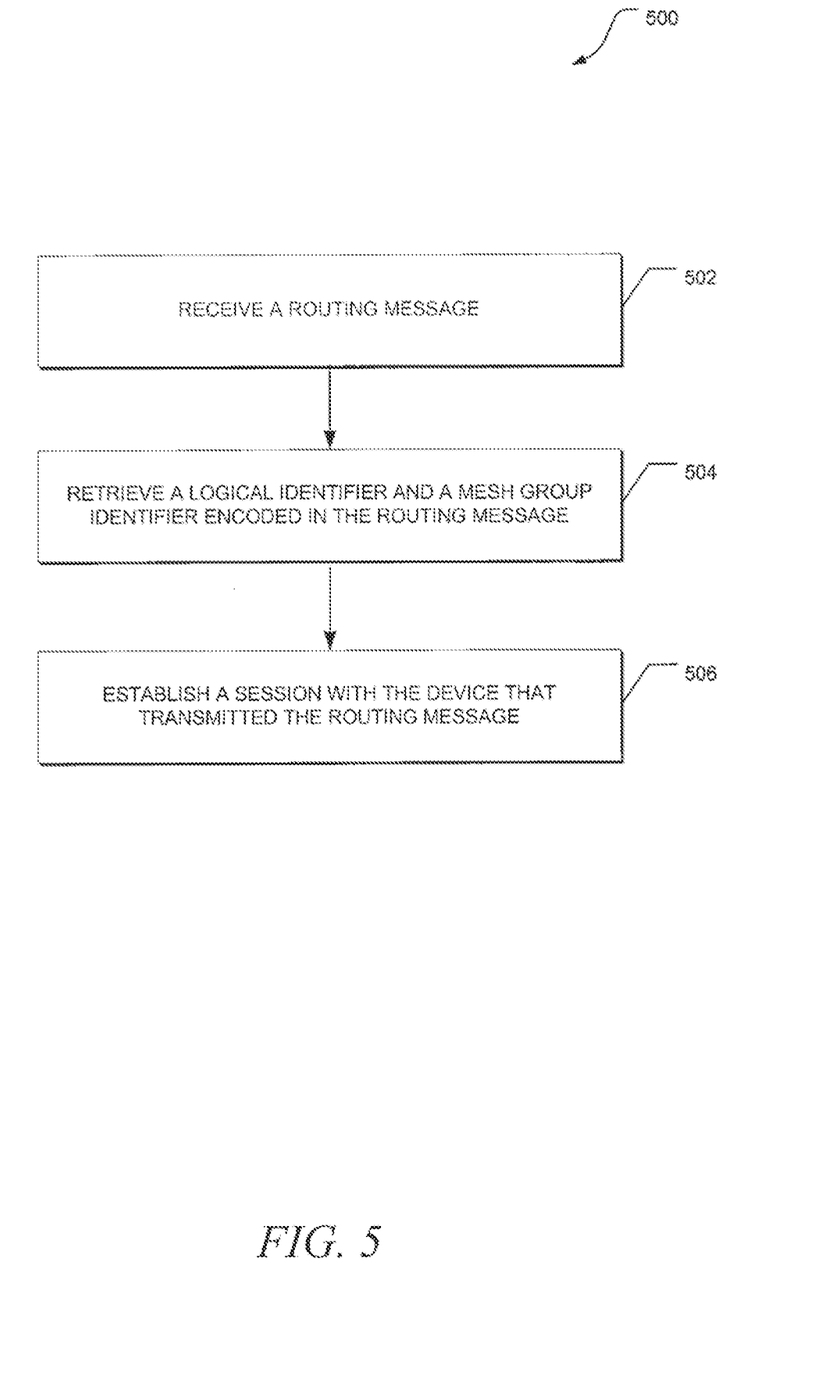
FIG. 5 depicts a flow diagram of a general overview of a method, in accordance with an embodiment, for establishing sessions with devices that advertised their availability.

FIG. 5 depicts a flow diagram of a general overview of a method 500, in accordance with an embodiment, for establishing sessions with devices that advertised their availability. In an embodiment, the method 500 may be implemented by the dynamic discovery module 208 and the inter-domain routing protocol procedures module 210 of FIG. 2 and employed in the apparatus 200. As depicted in FIG. 5, a device or apparatus receives a routing message at 502. As discussed previously, this routing message is transmitted to communicate an identification of a remote device and a request to establish a session within a particular mesh group. Upon receipt of the routing message, a logical identifier assigned to the remote device and a mesh group identifier identifying the particular mesh group are retrieved from the routing message at 504.

Once the remote device and the mesh group are identified based on the logical identifier and the mesh group identifier, respectively, a session is established with the remote device at 506. Such an establishment procedure may, for example, involve identifying whether the received mesh group identifier matches a locally configured mesh group identifier. If the received mesh group identifier does not match the locally configured mesh group identifier, then the device is configured for a different mesh group and a session is not established with the remote device. On the other hand, if the received mesh group identifier matches the locally configured mesh group identifier, then a session is established with the remote device. It should be appreciated that the establishment of the session is based on standard inter-domain routing protocol procedures. In BGP, for example, an OPEN message, which is used to initiate or open a BGP session, is transmitted to the remote device. In response to this OPEN message, another OPEN message from the remote device is received. To maintain the BGP session, KEEPALIVE messages may be periodically transmitted to the remote device or exchanged until the BGP session has ended.

Figure 6:
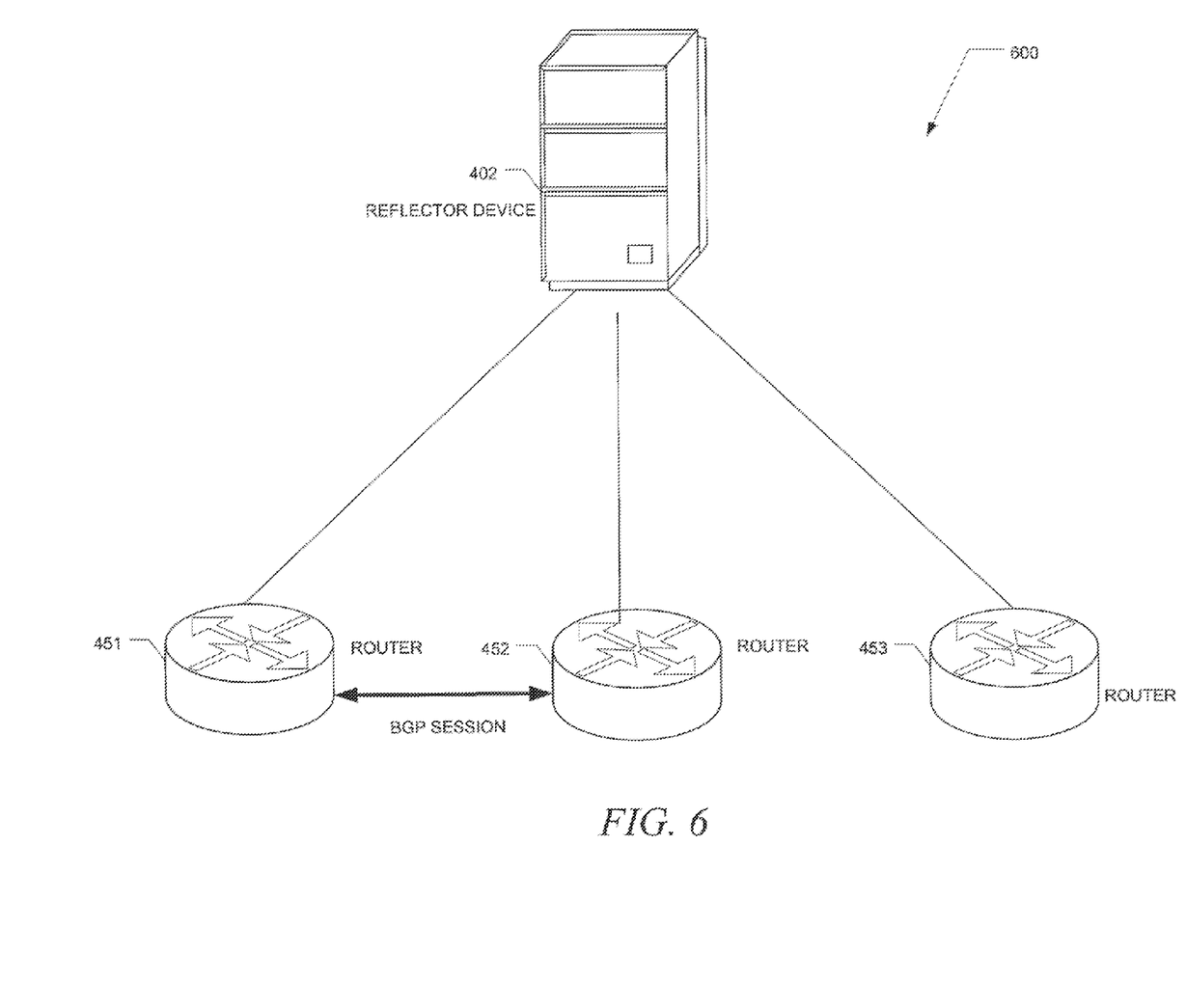
FIG. 6 depicts a diagram of a system, in accordance with an illustrative embodiment, for establishing a BGP session between routers in a computer network.

FIG. 6 depicts a diagram of a system 600, in accordance with an illustrative embodiment, for establishing a BGP session between routers 451 and 452 in a computer network. In this example, the system 600 includes a reflector device 402 in communication with routers 451-453. Each router 451, 452, or 453 is not in communication with each other because the routers 451-453 have not yet discovered each other at this point in time.

As illustrated previously in FIG. 4, the router 451 transmits a BGP update message with its IP address as a logical identifier and a mesh group identifier to the reflector device 402, which reflects this BGP update message to the routers 452-453. Both routers 452 and 453 receive the BGP update message and retrieve the IP address as a logical identifier and the mesh group identifier encoded in the BGP update message. In the example of FIG. 6, the router 453 compares the received mesh group identifier with its locally configured mesh group identifier and identifies a mismatch of the mesh group identifiers. The router 453 is therefore not configured to join the particular mesh group identified by the mesh group identifier. As a result, the router 453 ignores the received BGP update message and does not establish a session with the remote router 451 that transmitted the BGP update message.

On the other hand, the router 452 identifies a match of the received mesh group identifier with its locally configured mesh group identifier. The router 452 therefore is configured to join the particular mesh group identified by the mesh group identifier. As a result, the router 452 attempts to establish a BGP session with the router 451 based on the received logical identifier and the mesh group identifier. As discussed above, the router 452 may establish a BGP session with the router 451 by sending an OPEN message to the router 451 identified by the IP address. Upon receipt of the OPEN message from the router 452, the router 451 transmits a second open message to the router 452. The exchange of the OPEN messages initiates the BGP session and this BGP session is kept open by periodic exchanges of KEEPALIVE messages between the routers 451 and 452. With the BGP session established, the routers 451 and 452 can then exchange routing information such that each router 451 or 452 receives information on all the routes from each other, and not just the best route. Therefore, if the best route becomes unavailable, then each router 451 or 452 can quickly reroute the network traffic along an alternate route.

After the BGP session has been established between the routers 451 and 452, the router 452 can terminate or end the BGP session by transmitting a request to withdraw from the BGP session in the form of a BGP update message. In an embodiment, the router 452 may request a withdrawal from the BGP session by encoding its IP address as a logical identifier and the mesh group identifier in the MP_UN-REACH_NLRI attribute of the BGP update message. The router 452 then transmits this encoded BGP update message to the reflector device 402, which reflects it to routers 451 and 453 that are in communication with the reflector device 402. Upon receipt of this BGP update message with the IP address (as a logical identifier) and mesh group identifier encoded in the MP_UNREACH_NLRI attribute, the router 451, which is in a BGP session with the router 452, thereafter withdraws from the BGP session.

It should be noted that before the establishment of the BGP session, the routers 451-453 initially negotiate with the reflector device 402 a capability to handle dynamic discovery of devices within in the computer network. In an embodiment, the negotiation may be made by exchanging BGP open messages with the reflector device 402. A BGP open message includes a common capability field (or capability code field) that identifies the capability of the device that transmitted the BGP open message. A router 451, 452, or 453 may signal that it can handle dynamic discovery of remote devices by specifying a particular value in this common capability field. For example, a value of "1" in the common capability field can indicate that the device can handle dynamic discovery white a value of "0" can indicate that the device cannot handle dynamic discovery.

Still referring to FIG. 6, the dynamic discovery mechanism may also include an anti-network attack mechanism where session requests from unidentified devices are ignored. In this embodiment, upon receipt of the BGP update message with the encoded logical identifier identifying the router 451, the router 452 may store the logical identifier in a data structure. Generally, a data structure provides context for the organization of data. Examples of data structures include tables, arrays, linked lists, databases, and other data structures. For example, the router 452 may store received logical identifiers in a BGP peer database.

When the router 452 receives a request from a remote device to establish a session, the router 452 first compares the logical identifier encoded in the request with the logical identifiers stored in the data structure. If a match is identified, then the router 452 establishes a session with that remote device that transmitted the request because the match identifies that the remote device was dynamically discovered by the above-referenced mechanisms and therefore can be trusted to establish a session. On the other hand, if there is a mismatch with the logical identifiers stored in the data structure, then it identifies that the remote device was not dynamically discovered using the above-referenced mechanisms and therefore this request is not authorized. Accordingly, the router 452 can simply ignore this request to establish the session based on the mismatch.

Figure 7:
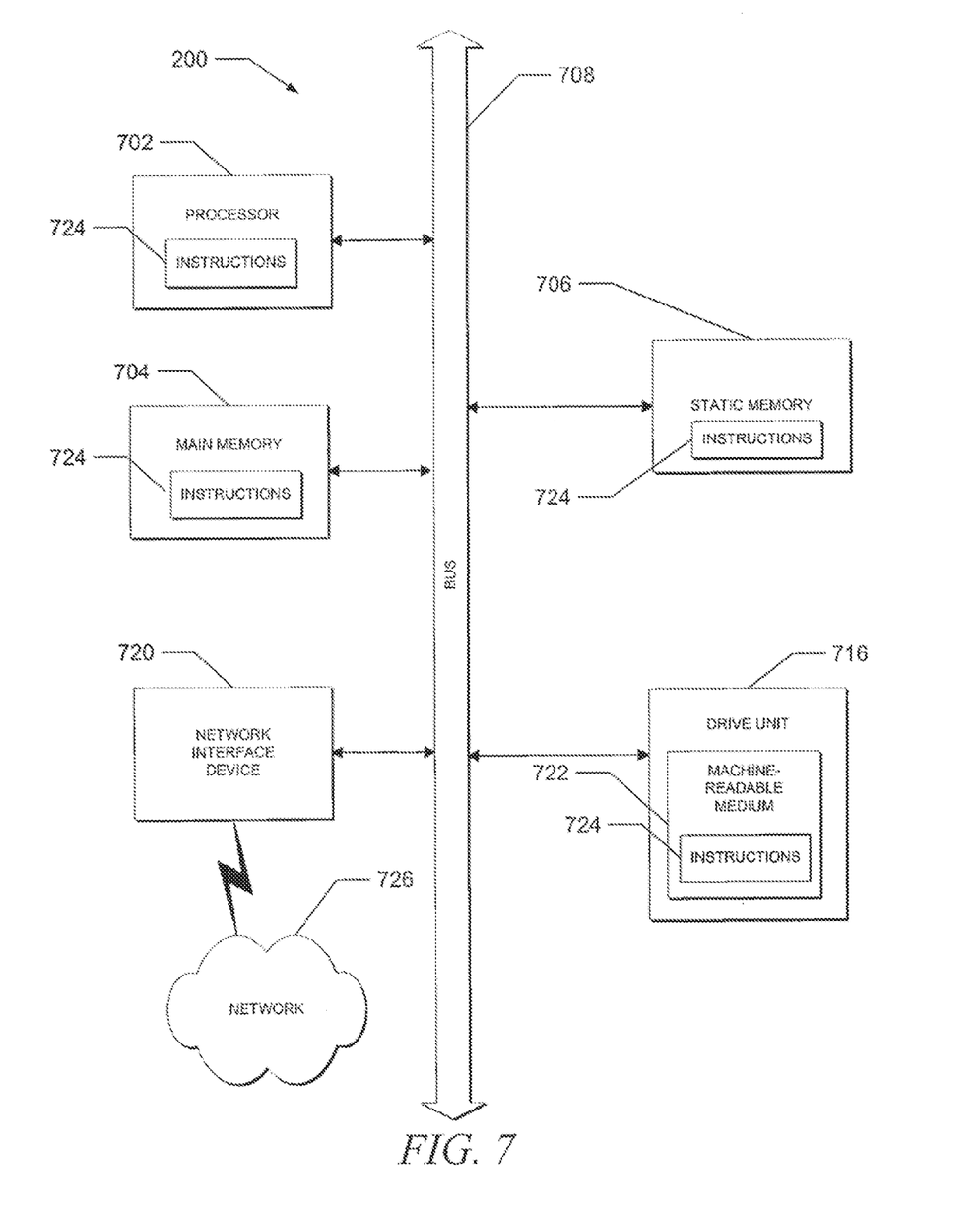
FIG. 7 is a simplified block diagram of a machine in the example form of an apparatus within which a set of instructions, for causing the machine to perform any one or more of the methodologies discussed herein, may be executed.

FIG. 7 is a simplified block diagram of a machine in the example form of an apparatus 200 within which a set of instructions, for causing the machine to perform any one or more of the methodologies discussed herein, may be executed. In alternative embodiments, the machine may be connected (e.g., networked) to other machines. The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example apparatus 200 includes a processor 702 (e.g., a central processing unit (CPU)), a main memory 704, and a static memory 706, which communicate with each other via bus 708. The apparatus 200 may also include a disk drive unit 716 and a network interface device 720.

The disk drive unit 716 includes machine-readable medium 722 on which is stored one or more sets of instructions and data structures 724 (e.g., software) embodying or utilized by any one or more of the methodologies or functions described herein. The instructions may also reside, completely or at least partially, within the main memory 704 and/or within the processor 702 during execution thereof by the apparatus 200, with the main memory 704 and the processor 702 also constituting machine-readable, tangible media. The instructions 724 may further be transmitted or received over network 726 via network interface device 720 utilizing any one of a number of well-known transfer protocols.

While machine-readable medium 722 is shown in an embodiment to be a single medium, the term "machine-readable medium" should be taken to include a single medium or multiple media (e.g., a centralized or distributed database, and/or associated caches) that store the one or more sets of instructions. The term "machine-readable medium" shall also be taken to include any medium that is capable of storing, encoding or carrying a set of instructions for execution by the machine and that cause the machine to perform any one or more of the methodologies of the present application, or that is capable of storing, encoding or carrying data structures utilized by or associated with such a set of instructions. The term "machine-readable medium" shall accordingly be taken to include, but not be limited to, solid-state memories, optical and magnetic media, and carrier wave signals.

While the invention(s) is (are) described with reference to various implementations and exploitations, it will be understood that these embodiments are illustrative and that the scope of the invention(s) is not limited to them. In general, techniques for route convergence may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the invention(s).

What is claimed is:

1. Logic encoded on one or more non-transitory, tangible media and when executed cause operations to be performed, the operations comprising:

identifying a logical identifier assigned to a device;

identifying a mesh group identifier identifying a mesh group;

encoding the logical identifier and the mesh group identifier in a routing message used in an inter-domain routing protocol; and transmitting the routing message to a reflector device in communication with the device, the reflector device configured to transmit the routing message to a remote device included in a computer network, the remote device using the routing message to discover the device by way of the reflector device.

2. The logic of claim 1, wherein the routing message communicates an identification of the device based on the logical identifier and a request to establish a session within the mesh group.

3. The logic of claim 1, wherein the routing message communicates an identification of the device based on the logical identifier and a request to withdraw from a session within the mesh group.

4. The logic of claim 1, wherein the inter-domain routing protocol is a Border Gateway Protocol (BGP) and the routing message is a BGP update message.

5. The logic of claim 4, wherein the BGP update message includes a Network Layer Reachability Information (NLRI) field, and wherein the logical identifier and the mesh group identifier are encoded in the NRLI field.

6. The logic of claim 1, further comprising negotiating with the reflector device a capability to handle discovery of the remote device included in the computer network.

7. The logic of claim 1, wherein the logical identifier is an Internet Protocol address.

8. Logic encoded on one or more non-transitory, tangible media and when executed cause operations to be performed, the operations comprising:

receiving a routing message from a reflector device, the routing message being used in an inter-domain routing protocol and communicating an identification of a remote device and a request to establish a session within a mesh group, the routing message enabling a discovery of the remote device by way of the reflector device;

retrieving from the routing message a logical identifier assigned to the remote device and a mesh group identifier identifying the mesh group; and establishing the session with the remote device that transmitted the routing message based on the logical identifier and the mesh group identifier.

9. The logic of claim 8, wherein the session is a Border Gateway Protocol (BGP) session and wherein the operation of establishing the BGP session, when executed, further comprising:

transmitting a first OPEN message to the remote device identified by the logical identifier;

receiving a second OPEN message from the remote device in response to the first OPEN message; and transmitting a KEEPALIVE message to the remote device in response to receipt of the second OPEN message.

10. The logic of claim 8, further comprising identifying a match of the mesh group identifier with a locally configured mesh group identifier.

11. The logic of claim 8, further comprising:

storing the logical identifier in a data structure;

receiving a request to establish a further session with a further remote device, the request include a further logical identifier assigned to the further remote device;

comparing the further logical identifier with the logical identifier stored in the data structure; and ignoring the request to establish the further session based on a mismatch of the further logical identifier with the logical identifier.

12. The logic of claim 8, further comprising negotiating with the reflector device a capability to handle discovery of the remote device.

13. The logic of claim 8, wherein the inter-domain routing protocol is a Border Gateway Protocol (BGP), the routing message is a BGP update message, and the session is a BGP session.

14. The logic of claim 13, wherein the BGP update message includes a Network Layer Reachability Information (NLRI) field, and wherein the logical identifier and the mesh group identifier are encoded in the NRLI field.

15. An apparatus comprising:

at least one processor; and a machine-readable medium in communication with the at least one processor, the machine-readable medium being configured to store a dynamic discovery module, the dynamic discovery module being executed by the at least one processor cause operations to be performed, comprising:

identifying a logical identifier assigned to a device;

identifying a mesh group identifier identifying a mesh group;

encoding the logical identifier and the mesh group identifier in a routing message used in an inter-domain routing protocol; and transmitting the routing message to a reflector device in communication with the device, the reflector device configured to transmit the routing message to a remote device included in a computer network, the remote device using the routing message to discover the device by way of the reflector device.

16. The apparatus of claim 15, wherein the inter-domain routing protocol is a Border Gateway Protocol (BGP) and the routing message is a BGP update message.

17. The apparatus of claim 16, wherein the BGP update message includes a Network Layer Reachability Information (NLRI) field, and wherein the logical identifier and the mesh group identifier are encoded in the NRLI field.

18. The apparatus of claim 15, wherein the operations comprising negotiating with the reflector device a capability to handle discovery of the remote device included in the computer network.

19. An apparatus comprising:

at least one processor; and a machine-readable medium in communication with the at least one processor, the machine-readable medium being configured to store a dynamic discovery module and an inter-domain routing protocol procedures module, the dynamic discovery module being executed by the at least one processor cause operations to be performed, comprising:

receiving a routing message from a reflector device, the routing message being used in an inter-domain routing protocol and communicating an identification of a remote device and a request to establish a session within a mesh group, the routing message enabling a discovery of the remote device by way of the reflector device; and retrieving from the routing message a logical identifier assigned to the remote device and a mesh group identifier identifying the mesh group; and the inter-domain routing protocol procedures module being executed by the at least one processor cause operations to be performed, comprising:
  establishing the session with the remote device that transmitted the routing message based on the logical identifier and the mesh group identifier.

20. The apparatus of claim 19, wherein the session is a Border Gateway Protocol (BGP) session and wherein the operation of establishing the BGP session, when executed, further comprising:
  transmitting a first OPEN message to the remote device identified by the logical identifier;
  receiving a second OPEN message from the remote device in response to the first OPEN message; and
  transmitting a KEEPALIVE message to the remote device in response to receipt of the second OPEN message.

21. The apparatus of claim 19, wherein the dynamic discovery module when executed by the at least one processor cause operations to be performed, further comprising:
  storing the logical identifier in a data structure;
  receiving a request to establish a further session with a further remote device, the request include a further logical identifier assigned to the further remote device;
  comparing the further logical identifier with the logical identifier stored in the data structure; and
  ignoring the request to establish the further session based on a mismatch of the further logical identifier with the logical identifier.

* * * * *